United States Patent [19]

Seeman

[11] 4,367,541
[45] Jan. 4, 1983

[54] APPARATUS AND METHOD FOR DETERMINING VELOCITY OF ACOUSTIC WAVES IN EARTH FORMATIONS

[75] Inventor: Bronislaw Seeman, Meudon, France

[73] Assignee: Schlumberger Technology Corporation, New York, N.Y.

[21] Appl. No.: 100,767

[22] Filed: Dec. 6, 1979

Related U.S. Application Data

[63] Continuation of Ser. No. 869,193, Jan. 13, 1978, abandoned.

[51] Int. Cl.$^3$ .......................... G01V 1/40; G01V 1/28
[52] U.S. Cl. ...................................... 367/34; 367/31; 367/75; 364/422
[58] Field of Search ............................ 367/27, 31–34, 367/40, 75; 364/422

[56] References Cited

U.S. PATENT DOCUMENTS

| | | | |
|---|---|---|---|
| 3,177,467 | 4/1965 | Brokaw | 367/27 |
| 3,292,729 | 12/1966 | Blizard | 367/27 |
| 3,390,377 | 6/1968 | Elliott | 367/31 |
| 3,424,268 | 1/1969 | Vogel | 367/40 |
| 3,622,969 | 11/1971 | Lefretar et al. | 367/34 |
| 3,696,331 | 10/1972 | Guinzy et al. | 367/27 |
| 3,900,824 | 8/1975 | Tranilly et al. | 367/31 |
| 3,962,674 | 6/1976 | Hamell | 367/31 |
| 4,210,966 | 7/1980 | Ingram | 367/31 |

OTHER PUBLICATIONS

Scott et al., "Acoustic Logging for Mining Applications," 6/5/74, pp. 1–10, SPWLA, 15th Symp.
Nations, "Lethology . . . Wave Transit Time Relationships," 6/5/74, pp. 3–8, SPWLA 15th Symp.

*Primary Examiner*—Nelson Moskowitz
*Attorney, Agent, or Firm*—David Carroll; Martin M. Novack

[57] ABSTRACT

The disclosure is directed to an apparatus and method for determining the velocity of acoustic wave energy propagating information surrounding a borehole. In accordance with one form of the apparatus, a transmitter is positioned in the borehole and periodically establishes acoustic wave energy in the surrounding formations. The acoustic wave energy is received at a plurality of spaced locations in the borehole and a plurality of signals are derived which are respectively representative of the wave energy received at the plurality of spaced locations in the borehole. Means are provided, for correcting a first portion of the signal from one of the receiver locations with first portions of signals from the other receiver locations. The time references of the first portion of the signals from the other locations are determined from an assumed velocity in conjunction with the time reference of the first portion of the signal from the one receiver location and the distance to each of the other receivers. The correlating is performed for a number of different assumed velocities to obtain a resultant first provisional velocity. In particular, the assumed velocity which yields substantially the maximum or best correlation is selected as the first provisional velocity. Means are also provided for correlating a second portion of the signal from said one of the receiver locations with second portions of the signals from the other receiver locations. Again, the second portions of the signals from the other receiver locations are determined using an assumed velocity, and the correlating of second portions is performed for a number of different assumed velocities to obtain a resultant second provisional velocity. An output velocity is then generated as a function of the first, second, and other similarly generated velocities. An output velocity for the compressional component of the acoustic wave energy and/or an output velocity for the shear component of the acoustic wave energy can be obtained using the disclosed technique.

98 Claims, 8 Drawing Figures

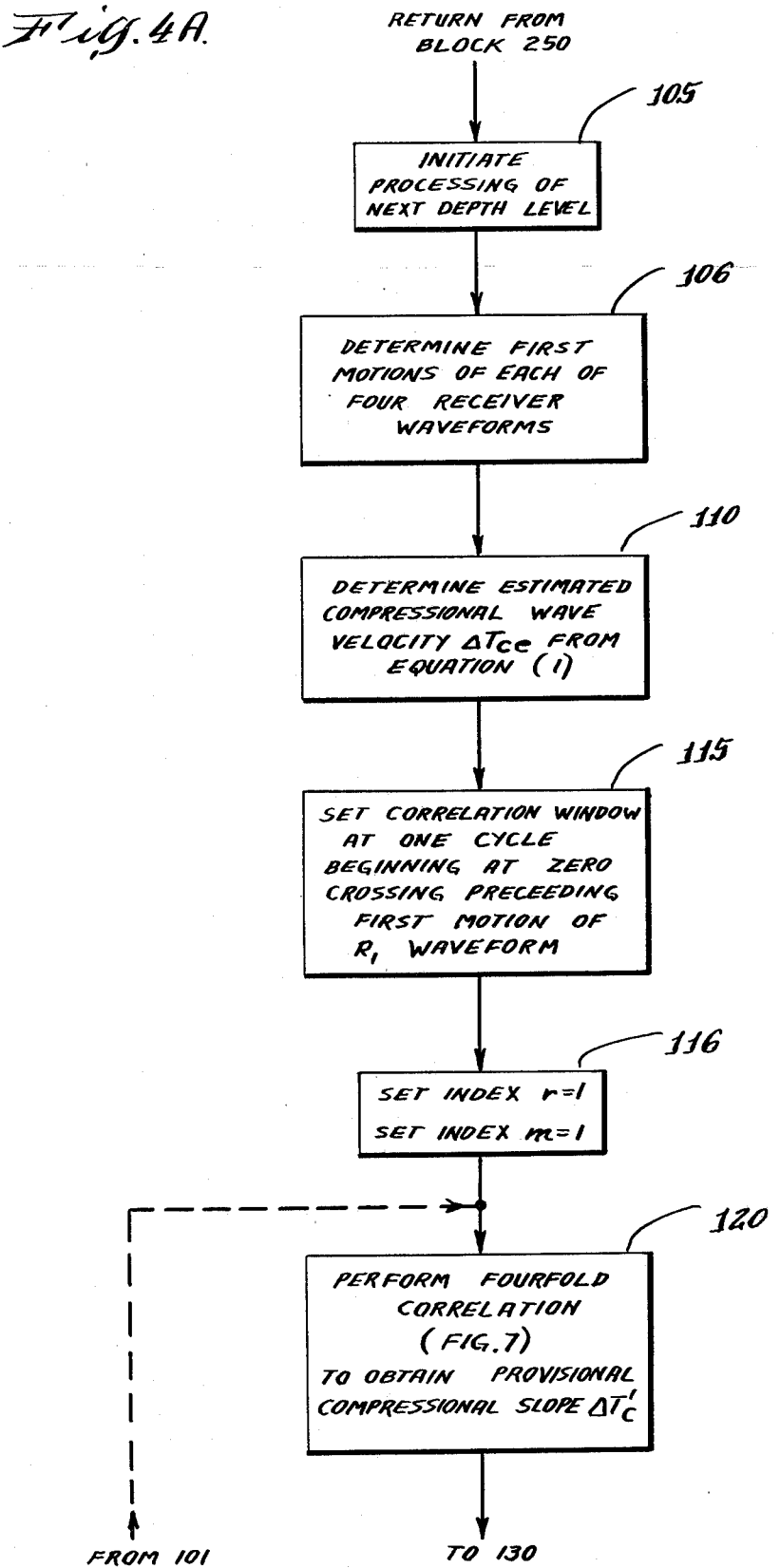

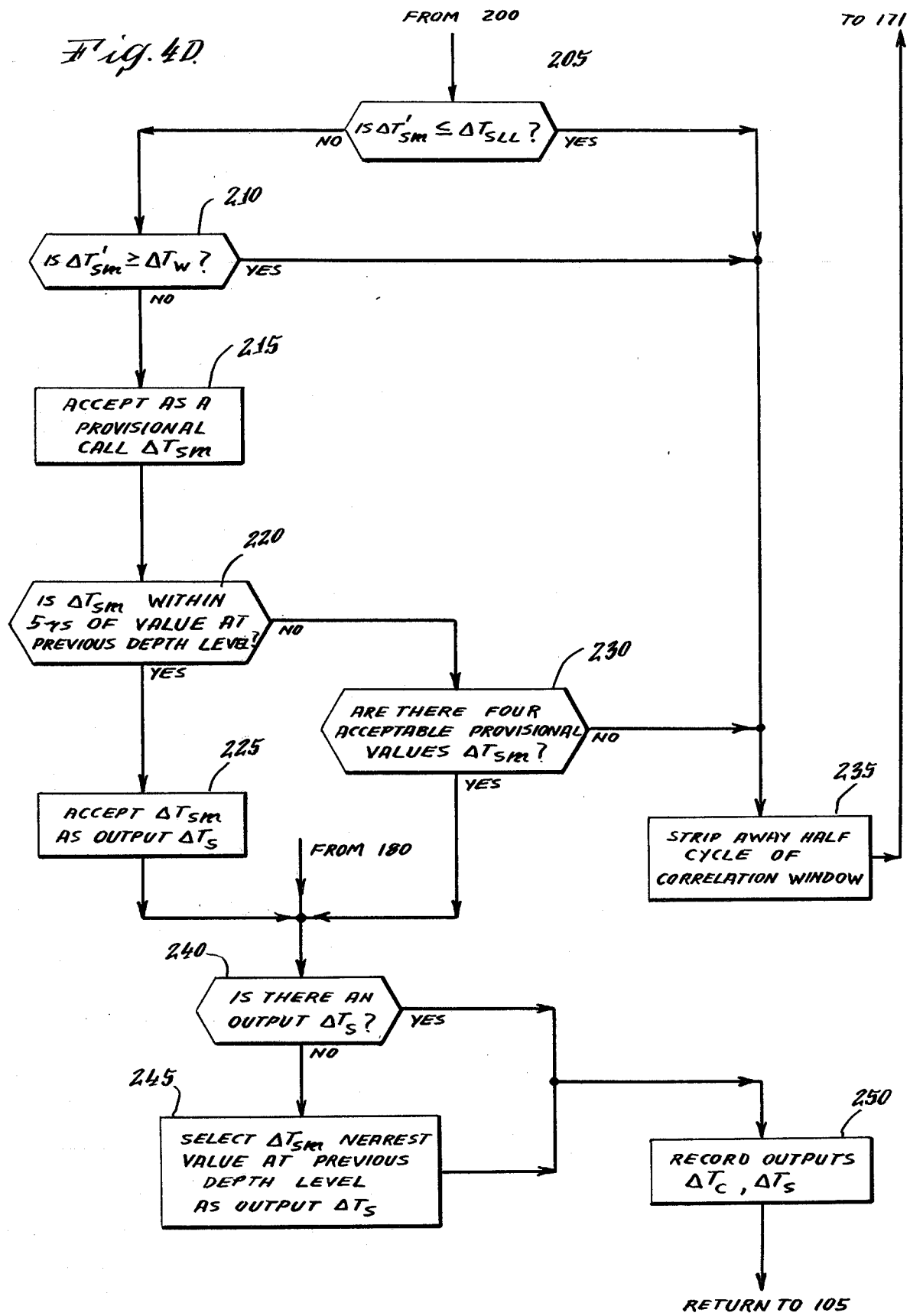

(DIFFERENT SLOPE)

APPARATUS AND METHOD FOR DETERMINING VELOCITY OF ACOUSTIC WAVES IN EARTH FORMATIONS

This is a continuation of application Ser. No. 869,193, filed Jan. 13, 1978, now abandoned.

BACKGROUND OF THE INVENTION

This invention relates to determination of properties of earth formations surrounding a borehole and, more particularly, to an apparatus and method for determining the velocity of propagation of acoustic wave energy propagating in such formations. Acoustic well logging is widely used to provide information concerning the characteristics of earth formations. Generally, measurements are made of the velocities of acoustic waves to reveal properties, such as porosity, of the formations surrounding a borehole. An acoustic well logging tool for measuring the velocity of acoustic waves typically employs a sonic pulse transmitter and a plurality of sonic receivers selectively spaced from the transmitter. The sonic receivers include transducers to convert the incident acoustic wave to an electrical waveform and suitable amplifiers to transmit the waveforms to surface located processing equipment.

It is well known that the compressional components of the acoustic wave energy generally travel at a higher velocity than the shear components of the acoustic wave energy. It is desirable, at each depth level, to obtain a reading of both the compressional velocity and shear velocity of the acoustic wave energy propagating through the formations since both contribute useful information concerning the formations. When a plurality of spaced receivers are employed, a correlation technique can be used to determine the desired velocity by correlating the signals obtained at the different receivers to obtain an output velocity value which optimally accounts for the difference in arrival times of the signals at the different receiver locations. Briefly, most correlation techniques are based on the assumption that substantially the same signal waveform will arrive at the different receiver locations at different times, the delay as between successively further receiver locations depending upon the distance between receivers and the velocity of propagation of the wave energy in the formations as between the receiver locations. Thus, a correlation technique can be employed to compare a delayed version of a signal arriving at a closer receiver location with a signal arriving at a more remote receiver location, the amount of delay (for a given known distance as between the receivers) depending on an assumed "trial" value of velocity of the acoustic wave energy as between the receiver locations in question. In simplified terms, the correlation technique involves trying various trial velocity values and determining which one provides the best "match".

To visualize a correlation procedure, assume that two signals to be correlated are plotted one-beneath-another on a common time axis, with the lower plotted signal being delayed (advanced in a direction of increasing time on the time axis) with respect to the upper plotted signal. Assume further that the time differential as between the signals (resulting from signal propagation time through formations of unknown nature over a known distance) is unknown. In performing the correlation, the signals are compared using a selected slope to account for the relative time difference between the signals. The selected slope is representative of a trial velocity for the particular correlation since, as previously noted, the time delay as between the two signals (and therefore the slope as between corresponding points on the two signals plotted on the same time axis) is a function of the velocity of propagation of the signals. The comparison is generally done by multiplying the instantaneous values of the two signals at each corresponding point thereof and summing all the products to obtain a single correlation figure. Further correlation figures may then be determined for different trial velocities (or slopes), and the correlation figures may be plotted versus velocity. Ideally, this plot, called a "correlogram" will have a single, well defined peak, the peak (i.e., the single highest correlation figure) indicating the true velocity of propagation of the wave energy. If the wave energy has components which travel at different velocities, multiple peaks may be encountered. Noise and other complications in hostile borehole environment will, of course, also introduce difficulties in interpreting correlograms.

In the copending U.S. patent application Ser. No. 581,381, now abandoned in favor of continuation U.S. application Ser. No. 928,389, now U.S. Pat. No. 4,210,966, of J. Ingram, assigned to the same assignee as the present application, there is disclosed an acoustic logging technique wherein a multiple-fold correlation is utilized; that is, the instantaneous values of three or more signals are multiplied by each other in obtaining each correlation figure. This and other techniques set forth in that application have led to substantial advances in the art, but it is an object of the present invention to provide still further improvements in obtaining accurate values for the velocity of the acoustic wave components of sonic waves propagating in formations surrounding a borehole.

SUMMARY OF THE INVENTION

The present invention is directed to an apparatus and method for determining the velocity of acoustic wave energy propagating in formations surrounding a borehole. In accordance with one form of the apparatus of the invention, a transmitter is positioned in the borehole and periodically establishes acoustic wave energy in the surrounding formations. Means are provided for receiving the acoustic wave energy at a plurality of spaced locations in the borehole and for deriving a plurality of signals respectively representative of the wave energy received at the plurality of spaced locations in the borehole. Preferably, at least four spaced receivers are employed, and the embodiments illustrated herein employ four spaced receivers. The main aspects of the present invention are concerned with techniques for obtaining velocity-representative values from the plurality of received signals, and not with any particular technique for obtaining these signals in the first place (the method of obtaining these signals being known in the art and disclosed, for example, in the above-referenced copending U.S. patent application Ser. No. 581,381, now U.S. Pat. No. 4,210,966). Accordingly, it will be understood that the principles of the invention to be described are applicable to the processing of signals obtained directly from a borehole or to derived signals which were previously recorded or communicated from a remote location. Also, as used herein, the term "signals" is intended generically to include any waveforms that are in a form suitable for machine processing.

In accordance with an embodiment of the invention, means are provided for correlating a first portion of the signal from one of the receiver locations with first portions of signals from the other receiver locations. The time references of the first portion of the signals from the other locations are determined from an assumed velocity in conjunction with the time reference of the first portion of the signal from the one receiver location and the distance to each of the other receivers. (This simply means that the signal travel time as between receivers depends upon velocity and distance traveled.) The correlating is performed for a number of different assumed velocities, within a limited range of velocities, to obtain a resultant first provisional velocity. In particular, the assumed velocity which yields substantially the maximum or best correlation is selected as the first provisional velocity. Means are also provided for correlating a second portion of the signal from said one of the receiver locations with second portions of the signals from the other receiver locations. Again, the second portions of the signals from the other receiver locations are determined using an assumed velocity, and the correlating of second portions is performed for a number of different assumed velocities to obtain a resultant second provisional velocity. Means are then provided for generating an output velocity as a function of the first and second provisional velocities.

The output velocity may be selected as one of the first or second provisional velocities, for example the provisional velocity which is closest to the velocity determined at an adjacent depth level. Alternatively, the output velocity may be any other desired function of the provisional velocities, for example an average thereof. Also, correlation of third or more portions of the signal may be performed to obtain third or further provisional velocities, with the output velocity also being a function of these further provisional velocities.

The first and second portions of the signals may be compressional wave components thereof, and the output velocity will then be an output compressional wave velocity. Alternatively, the first and second portions of the signals may be shear wave components thereof, in which case the output velocity will be an output shear wave velocity. Of course, the technique may be utilized on both the compressional wave components and shear wave components of the signals to obtain both an output compressional wave velocity and an output shear wave velocity. The first and second portions preferably each have a duration of an integral number of half-cycles, not exceeding two full cycles, of the signal from said one location.

Generally, the output velocity (compressional and/or shear) is determined for each of a number of adjacent depth levels. In a disclosed embodiment, the generated output velocity, in addition to being a function of the previously mentioned provisional velocities, is selected taking into account the output velocity that had been generated at an adjacent depth level.

The technique of the present invention of determining provisional wave velocities by correlating, over a limited range of velocities (e.g. a range of about fifty microseconds per foot), relatively small portions of the different receiver waveforms, tends to reduce prior art problems associated with multiple correlation peaks that could occur when longer portions of the signals are correlated. Also, individual portions of the signals containing spurious information have less tendency to upset the selection of accurate output values since, in an embodiment to be described, selection is from a plurality of provisional values and an individual spurious value is likely to be discarded without affecting the output values.

Further features and advantages of the invention will become more readily apparent from the following detailed description when taken in conjunction with the accompanying drawings.

BRIEF DESCRIPTION OF THE DRAWINGS

FIGS. 4A, 4B, 4C and 4D, when placed one-below-another, illustrate a flow chart suitable for programming the processor 40 of FIG. 1 to perform operations in accordance with the invention.

DESCRIPTION OF THE PREFERRED EMBODIMENT

Figure 1:
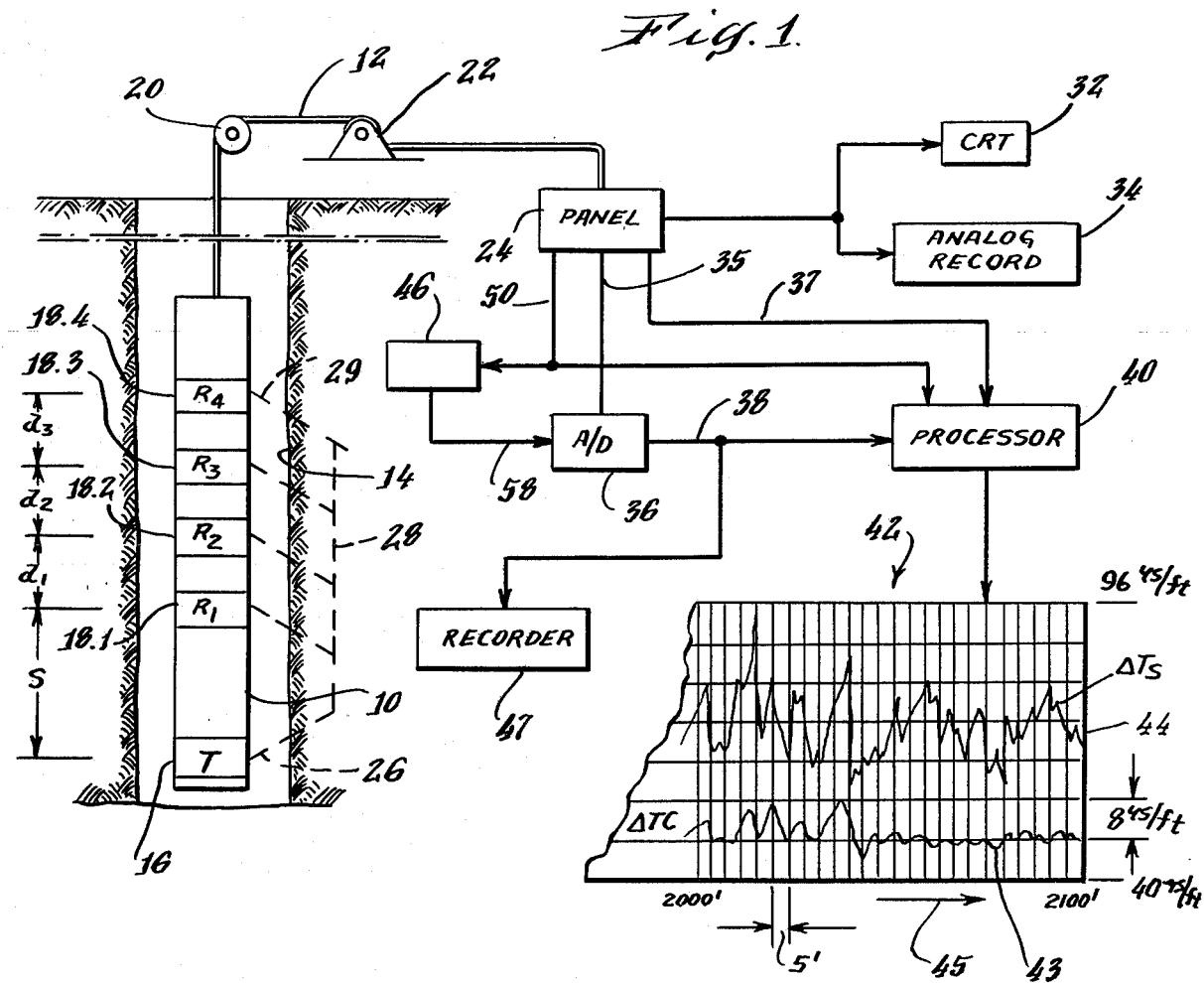
FIG. 1 is a block diagram of an apparatus in accordance with an embodiment of the invention, and includes a recording or log of acoustic velocity versus depth that can be set forth using the invention.

Referring to FIG. 1, a sonic borehole logging tool 10, with centering elements not shown, is illustrated as being suspended from a cable 12 in a borehole 14. The tool 10 includes a transmitter 16 located at the bottom of the tool and preferably four or more selectively spaced sonic receivers 18.1, 18.2, 18.3 and 18.4. The cable 12 is shown fed over a pulley 20 from a cable supply 22 and is electrically connected to a panel 24. The panel 24 includes suitable amplifiers, switching circuits and electrical supplies for tool 10 and the firing of sonic transmitter 16. The tool 10 includes suitable amplifiers and controls needed to enable receivers 18 to sequentially detect sonic waves and provide panel 24 with waveforms representative of the acoustic waves incident upon transducers in receivers 18.

Figure 2:
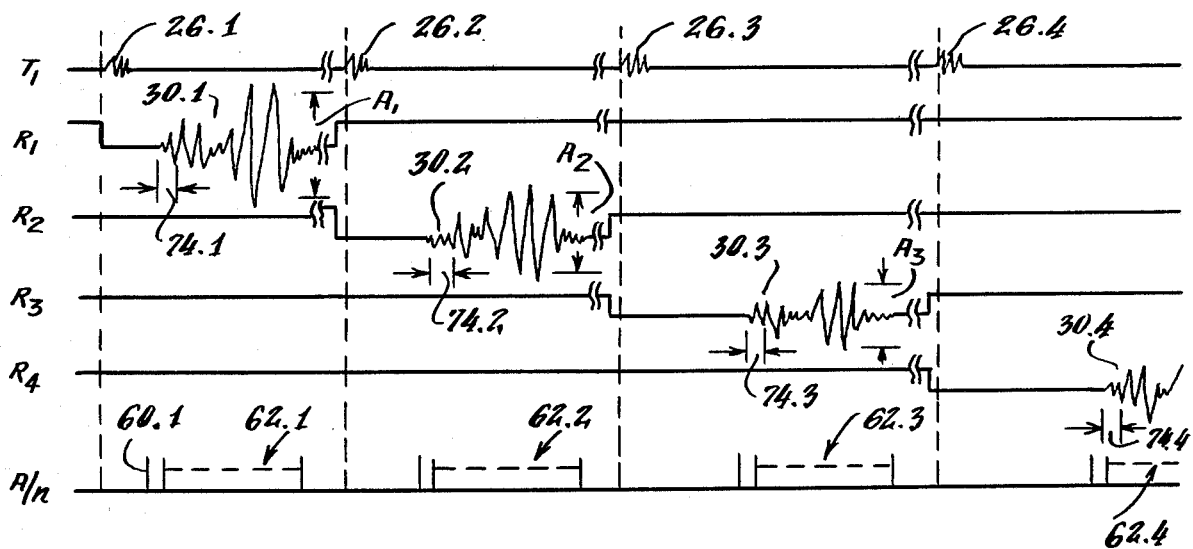
FIG. 2 is a graph which illustrates the nature of the signals or waveforms received at the four receivers of the logging device in FIG. 1.

In the operation of the sonic logging tool 10, the transmitter 16 is regularly energized (about ten times per second) to produce sonic pulses such as 26 in FIG. 2 while the tool is moved upwardly at a speed of the order of one foot per second. Each pulse 26 is directed at the formation in which an acoustic wave such as 28 is launched. The acoustic wave 28 has components which travel through the formation towards the receivers 18 and in turn produce wave components 29 which are incident upon the receivers 18 to produce a set of signals or waveforms such as 30.1, 30.2, 30.3 and 30.4 shown in FIG. 2. Waveforms 30 may also include those sonic waves which, after travel through the borehole, are incident upon receivers 18.

The transmitter is periodically activated, and the receivers 18 preferably are alternately enabled to generate waveforms in the sequence as shown by waveforms 30.1-30.4. In this manner, waveforms which are of several milliseconds duration can be analyzed to detect velocity in a manner to be described. In addition, the sequential enabling of receivers 18 allows their outputs to be multiplexed onto a common line towards panel 24. This is an advantage when the analog form of the outputs of receivers 18 is to be conducted to panel 24 since the analog waveforms 30 are all exposed to the same electronic amplification and cable attenuation to enable amplitude comparisons. The advance of the tool 10 during the time needed to generate one complete set of waveforms 30 can be controlled and is not sufficient to appreciably affect velocity measurements.

The receivers 18 each typically but not necessarily bear a known spacing "d" from each other (i.e. $d_1 = d_2 = d_3 = d$ in FIG. 1) while the distance "S" between receiver 18.1 and transmitter 16 is known to further accurately locate all the receivers from transmitter 16. Thus, for example, if the arrival of the compressional wave could be precisely detected at each receiver, then the time between respective receiver arrivals would provide an accurate determination of the velocity of the compressional wave. As described in the copending U.S. application Ser. No. 581,381 of J. Ingram, employing a multiple number of receivers 18, such as four, allows a generally more accurate and reliable determination of wave velocities, although increased distance of the far receiver from the transmitter results in a substantially attenuated waveform at this receiver.

The signals 30 may arrive at the panel 24 either in analog form or sampled form or may be digitized downhole. For example, the tool 10 may be provided with an analog to digital (A/D) converter (not shown) to sample waveforms 30. The samples would then be transmitted along cable 12 to panel 24 for further processing. The waveforms 30 may be derived from a previously obtained record, communicated from another location, or derived directly from receivers 18. In the system depicted in FIG. 1, the waveforms 30 arrive in analog form at panel 24 where they may be coupled to a cathode ray tube 32 for real-time display and to a magnetic tape recorder 34 to provide an analog record. In order to utilize a sampled form of waveforms 30 they are shown coupled along a line 35 to an analog to digital converter 36 which generates samples of the waveforms at a high sampling rate on an output line 38.

Although not specifically illustrated in FIG. 1, panel 24 also provides depth signals from a depth sensor operatively coupled to the cable 12. The depth signals preferably are presented on line 37 in a format which is compatible with the format employed for the samples on line 38. The generation of depth signals is well known in the art of well logging and shall not be further described. The output from waveform sample 36 is applied to an apparatus 40 which processes the samples to produce velocity-representative values from waveforms 30. The apparatus 40 preferably is a general purpose digital computer, but may be any general purpose or special purpose digital or analog processor or special purpose circuitry. Also, with a recording capability present, processing need not necessarily be performed in real time. The output of apparatus 40 may be, for example, a plot 42 of the velocity of the compressional and shear wave components of the sonic wave as a function of well depth in feet. Curve 43 shows the velocity of the compressional wave, designated $\Delta T_c$, and curve 44 shows the velocity of the shear wave, designated $\Delta T_s$. The plot 42 is made by moving suitable logging paper in the direction indicated by arrow 45 while the tool is raised as reflected by the indicated depth values. (It is conventional in acoustic logging to present velocity in terms of microseconds per foot, which is actually the inverse of true velocity. This convention will be followed herein.)

As described in the abovereferenced copending U.S. application Ser. No. 581,381, now U.S. Pat. No. 4,210,966, and as illustrated in FIG. 2, the receivers 18 are sequentially enabled for successive firings of the transmitter 16. A portion of the electronics in device 10 provides waveform identification signals, which may be coded pulses such as a two bit code word, and which determine the particular receiver that is enabled. Such receiver waveform identification code, together with a pulse to identify the firing time of the transmitter 16 are delivered along cable 12 to panel 24. A magnetic recorder 47 is provided to record the waveform samples produced by A/D converter 36 as well as the waveform identification code transmitted along cable 12. As described in the referenced copending application, the panel 24 may be provided with a conversion control network 46 which selectively delays initiation of A/D converter 36, depending upon which receiver waveform is to be sampled. For example, if receiver waveforms 30 are each sampled by starting the same amount of time after the firing of transmitter 16 (or upon occurrence of its output pulse 26), the amount of useful information obtained varies as a result of receiver spacings "d". In order to preserve greater portions of the waveforms for subsequent analysis, a conversion control network can be used, but will not be treated herein.

A/D converter 36 commences conversion at the end of a delay $\Delta\tau$ which is a function of the distance between receiver 18 and transmitter 16 and the fastest expected velocity of the acoustic wave. The conversion process continues for a sufficient time period to provide samples of the waveforms of interest. A sampling rate of ten microseconds, for example, may be employed, and a total of 512 samples, or about five milliseconds, of sampled waveform duration will be obtained and be sufficient in most cases to determine the compressional and shear velocities of the sonic waves, as will be described hereinafter. However, it will be understood that the number of samples used in any one group will be varied with 512 being generally used herein as an illustrative example. A/D comverter 36 is provided with a suitable counter (not shown) which terminates the conversion process when the desired number of samples 60 (see FIG. 2) have been generated. The A/D conversion of each waveform 30 results in the generation of a group identified at 62 in FIG. 2 of 512 samples.

Since each sample 60 occurs at a known sampling rate, any one sample has an index value which can be directly related to the time interval measured from the time of occurrence of the sonic pulse 26 which resulted in the sampled waveform. Thus the first sample 60.1 in group 62.1 occurs at a time equal to $\Delta\tau + (N \times SR)$, where N is the index position value (N=0 for the first sample) and SR is the sampling rate in microseconds. In a similar manner, each sample 60 in the other groups 62.2, 62.3 and 62.4 can be precisely related in time to their associated transmitted sonic pulses 26.2, 26.3 and 26.4.

An example of how these index values can be used is as follows: Assume a given reference (e.g. "first motion") on the compressional wave is detected for the sample in group 62.1 at an index value N1, and the same given reference is detected in group 62.2 at index value N2. The time ΔT for that wave to travel the distance between receivers 18.1 and 18.2 would then be equal to (N2−N1) SR. At a ten microsecond sampling rate, the velocity of the compressional wave in microseconds per foot would be determined as (N1−N1)×10.

The samples applied to processor 40 are assembled in groups of 512 samples with each group coded to identify a waveform from a particular receiver. The processor 40 is provided with a buffer to enable accumulation of a pair of sets of waveforms, each set represents waveforms from all four receivers during a full operational cycle of the transmitter-receiver. Access to the buffer is under control of A/D converter 36 to enable transfer of the samples as they are produced.

Figure 3:
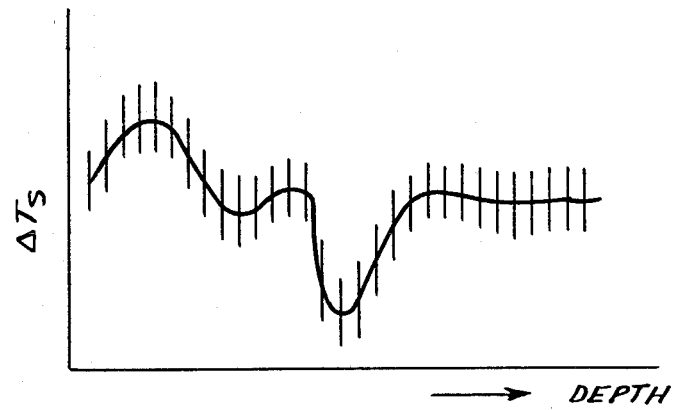
FIG. 3 is another recording or log of acoustic velocity versus depth that can be set forth using the invention.

The description set forth in conjunction with FIGS. 1–3, and the specific technique of sampling and using index numbers as described in the copending Ingram application, are intended to illustrate a manner in which a plurality of signals or waveforms can be obtained from a plurality of spaced acoustic receivers and loaded into a processor at known sampling times. It will become understood, however, that the novel aspects of this invention deal with apparatus and method for obtaining useful information, such as velocity-representative signals or graphs, from the plurality of signals or waveforms 30 which are loaded into processor 40, and any suitable technique can be employed to obtain the signals or waveforms 30 (the terms "signals" and "waveforms" being utilized interchangeably heren in this context). For example, all four receiver signals may be digitized, after a single transmitter firing, by a downhole A/D converter. A buffer memory and data transmission system may also be provided downhole. Also, the described indexing system sets forth an example of how timing registration between the sampled waveforms is established; but it will be understood that alternate methods may be employed. In this respect, and for clarity of explanation, the index number system set forth above will not be referred to each time timing registration considerations are set described below, although it will be understood that this index number technique can be utilized in each instance to keep track of the timing registration as between samples from the different receiver waveforms.

Figure 4B:
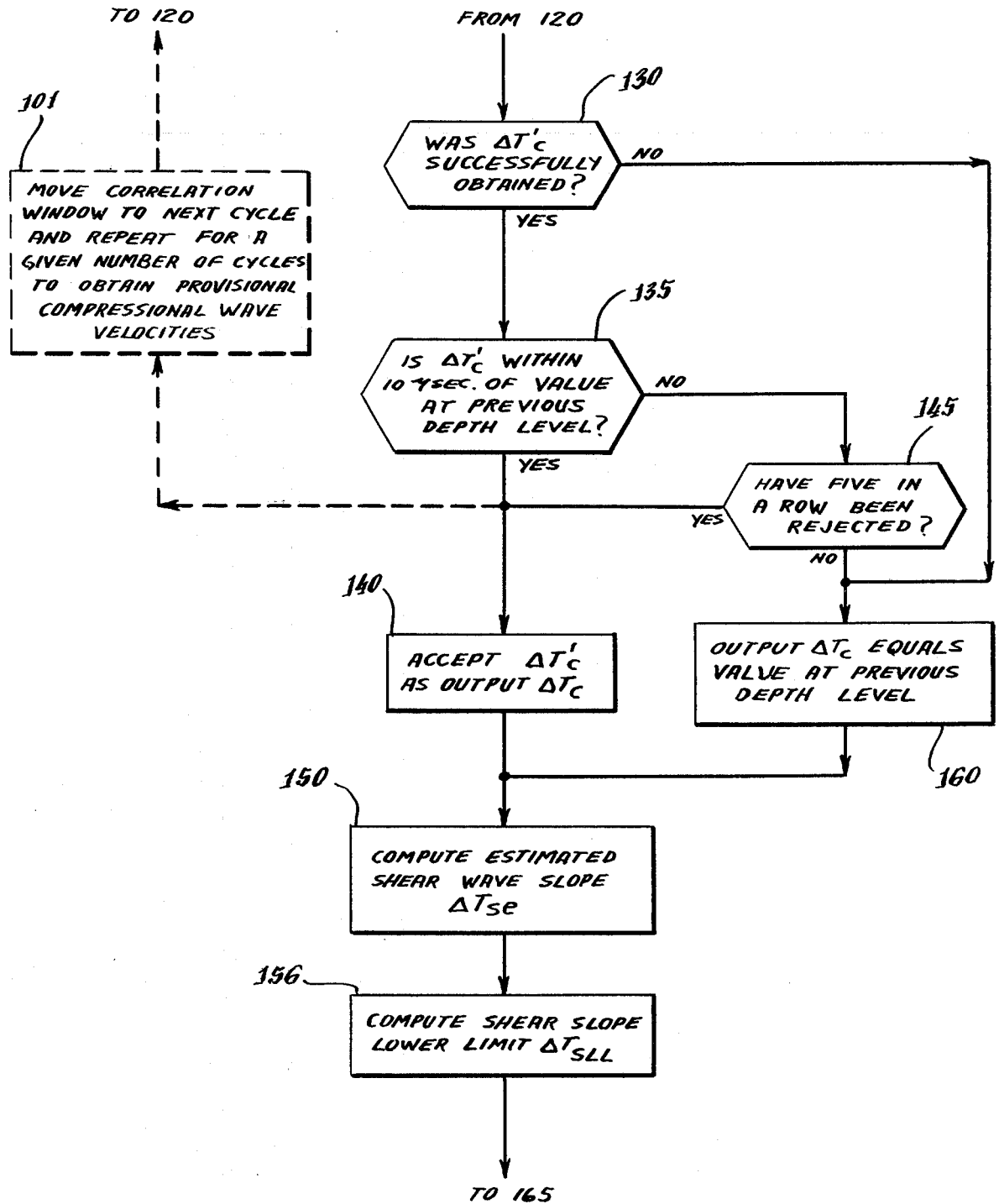
Figure 4C:
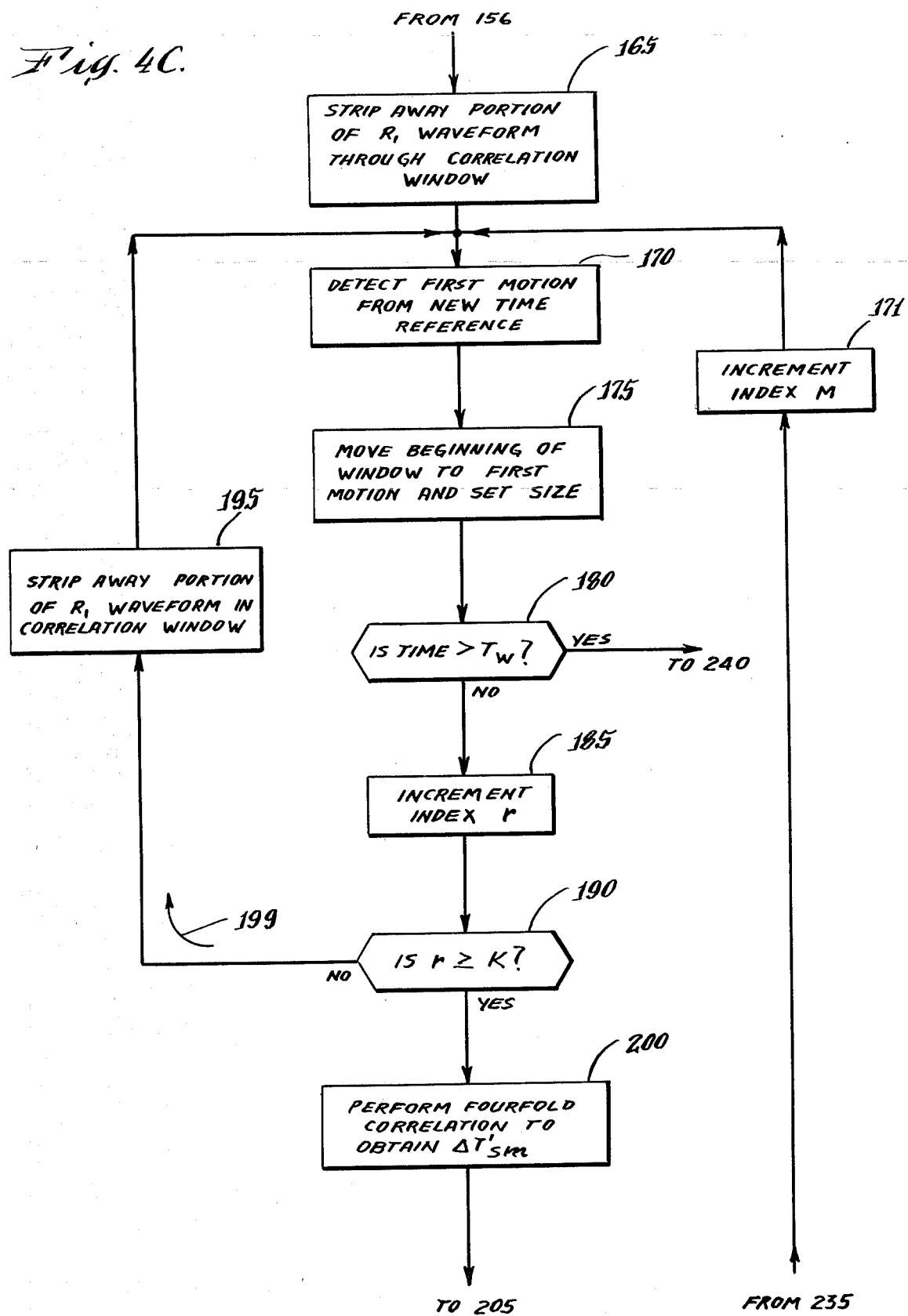
Figure 5:
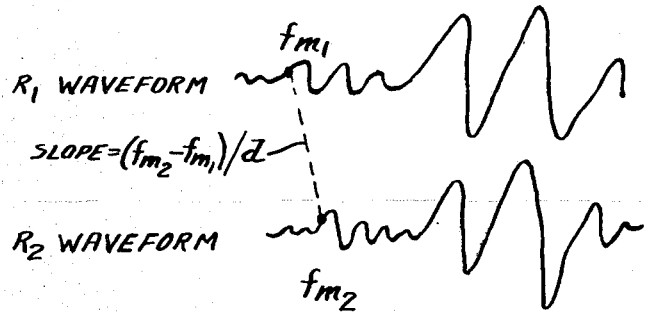
FIG. 5 illustrates the manner in which an initial estimate of slope is obtained from a pair of waveforms.

Referring to FIG. 4, there is shown a flow diagram suitable for programming the processor 40 to obtain output values of $\Delta T_c$ and $\Delta T_s$ at each depth level, e.g. the values shown in the graphs 43 and 44 of FIG. 1. The block 105 represents the initiation of processing for the next depth level. Block 116 is then entered, this block representing the determination of the "first motion" of each of the four receiver waveforms. As is known in the art, first motion can be determined by detecting when each waveform exceeds a predetermined threshold level. Block 110 represents a determination of an initial estimate of compressional velocity or slope, designated $\Delta T_{ce}$, obtained by averaging the slopes as between the first motion of the close receiver ($R_1$) waveform and the first motion of each of the other waveforms. (The term "slope", as used in this context, represents a time difference as between waveform sample points received at different receivers that are a known fixed distance apart. Since this characteristic time difference is proportional to the inverse of velocity, slope determinations are equivalent to determinations of velocity. Accordingly, the terms "slope" and "velocity" are, in this context, used interchangeably herein.) The signal received at the closest receiver, $R_1$, is generally the strongest and "cleanest" signal and it is therefore used as a main reference for obtaining the slopes from which the initial estimate of compressional velocity is determined. In particular, $\Delta T_{ce}$ is computed as:

$$\Delta T_{ce} = \frac{(fm_2 - fm_1)/d + (fm_3 - fm_1)/2d + (fm_4 - fm_1)/3d}{3} \quad (1)$$

where $fm_1$ through $fm_4$ are the times of the first motions respectively detected in the waveforms of $R_1$ through $R_4$, respectively. The three numerator terms are seen to be the three slopes which are averaged to obtain $\Delta T_{ce}$. FIG. 5 illustrates, in simplified form, how one of the slopes, in particular $(fm_2-fm_1)/d$, is obtained).

Figure 6:
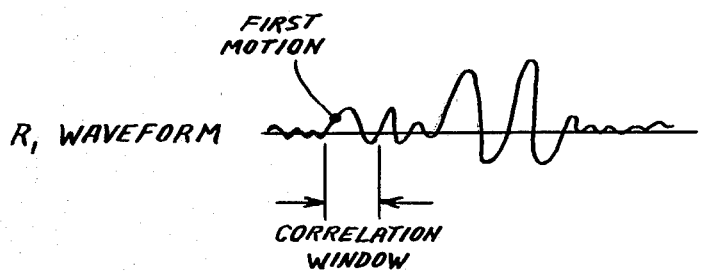
FIG. 6 illustrates the manner in which the correlation window is initially positioned with respect to the $R_1$ waveform.

Returning to FIG. 4, block 115 is next entered, this block representing the establishment of a correlation window whose end points are selected as respectively being at the zero crossing which precedes the first motion $fm_1$ and at the second zero crossing thereafter; i.e. a window substantially corresponding to the first full cycle of the compressional wave received at $R_1$. This may be readily done by scanning the samples of the $R_1$ waveform from point $fm_1$ until the appropriate zero crossings are obtained. FIG. 6 illustrates the correlation window on the $R_1$ waveform.

Figure 7:
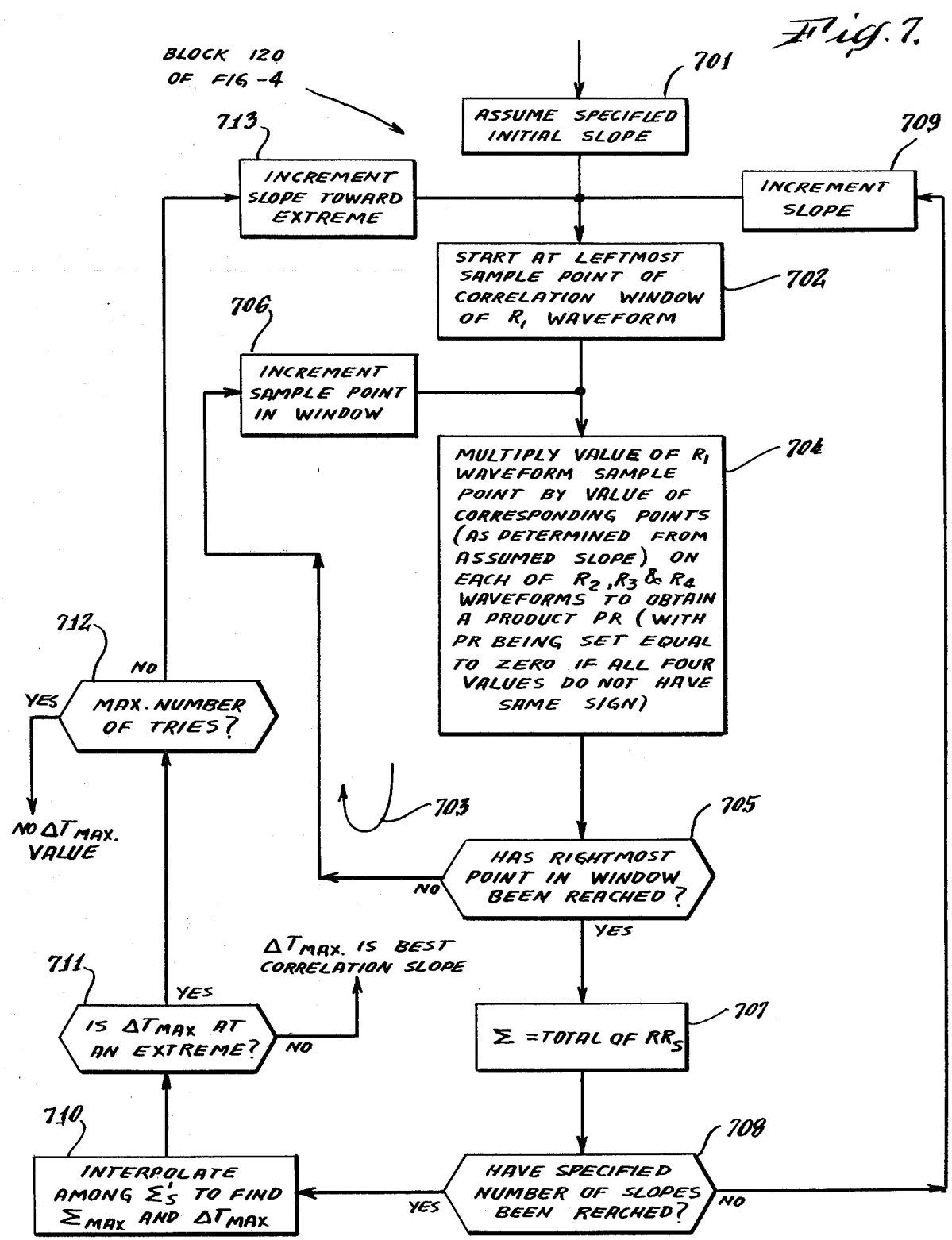
FIG. 7 is a flow chart representative of the functions of the block 120 of FIG. 4 and sets forth a technique of fourfold correlation.
Figure 8A:
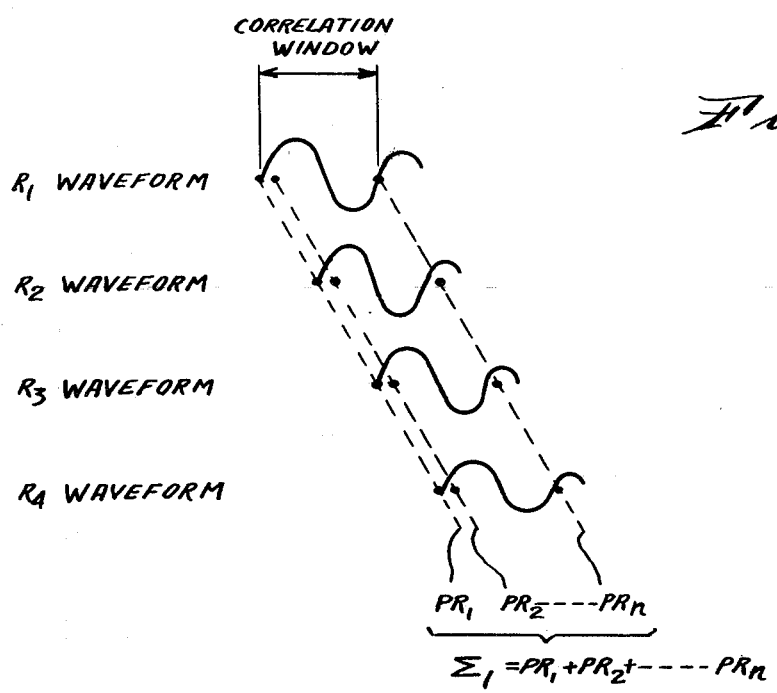
FIGS. 8A and 8B illustrate the manner in which a fourfold correlation is performed, with the correlations of FIGS. 8A and 8B each utilizing different slopes.

Two indices, r and m (to be utilized later), are next set equal to unity (block 116). A fourfold correlation is then performed, as represented by the block 120, to determine a provisional compressional velocity or slope, designated $\Delta T'_c$. (The basic concept of a fourfold correlation is described in the abovereference copening U.S. patent application Ser. No. 581,381, now U.S. Pat. No. 4,210,966.) The present technique of fourfold correlation is set forth in FIG. 7 which is a flow chart representative of the functions of block 120 of FIG. 4, and can be referred to during the present description of the fourfold correlation. An initisl assumed slope is first selected (block 701) as being the estmated compressional wave velocity of slope, $\Delta T_{ce}$. The value of each sample point of the $R_1$ signal within the correlation window is then multiplied by the value of a sample point on each of the other waveforms, the location of the sample point on the other waveforms being determined using the assumed slope (block 702 and loop 703). For example, the value at the leftmost point of the $R_1$ waveform within the correlation window is multiplied by the value of a point on the $R_2$ waveform that is displaced in time from the point on the $R_1$ waveform by $\Delta T_{ce}(d)$; i.e. the time that it would have taken the wave energy to travel the distance d between receivers $R_1$ and $R_2$ (FIG. 1) at an (inverse) velocity $\Delta T_{ce}$ (with $d_1=d_2=3=$for assumed equal spacings). The resultant partial product is then again multiplied by the value of a point on the $R_3$ waveform that is displaced in time from the point on the $R_1$ waveform by $\Delta T_{ce}(2d)$ and then again multiplied by the value of a point on the $R_4$ waveform that is displaced in time from the point on the $R_1$ waveform by $\Delta T_{ce}(3d)$. The resultant product, designated PR, is multlplied by weighting function which is utilized to take account of the signs of the values multiplied together. A convenient weighting function is simply unity when the four multiplicands have the same sign and is otherwise zero. The use of the weighting function avoids making a positive contribution to the correlation when two of the signals are positive and two are negative; i.e., the worst possible mismatch. The determination of the product PR is represented by block 704 of FIG. 7. In the simplified illustration of FIG. 8A, this first product is $PR_1$. The same procedure is then performed with respect to the next point of the $R_1$ waveform within the correlation window (diamond 705 and block 706 of FIG. 7) to obtain a product designated as $PR_2$, also shown in the simplified FIG. 8A. This procedure is then repeated for each point of the correlation window to obtain products $PR_3$, $PR_4$ . . . $PR_n$, where n is the number of points in the correlation window. The summation, designated as $\Sigma$, of all the products is then determined (block 707 of FIG. 7) as:

$$\Sigma_1 = PR_1 + PR_2 + \ldots \ldots PR_n$$

where the subscript 1 designates that this summation is a correlation figure associated with the first estimated slope. FIG. 8A is again referred to for an understanding of how $\Sigma_1$ is generated.

Figure 9:
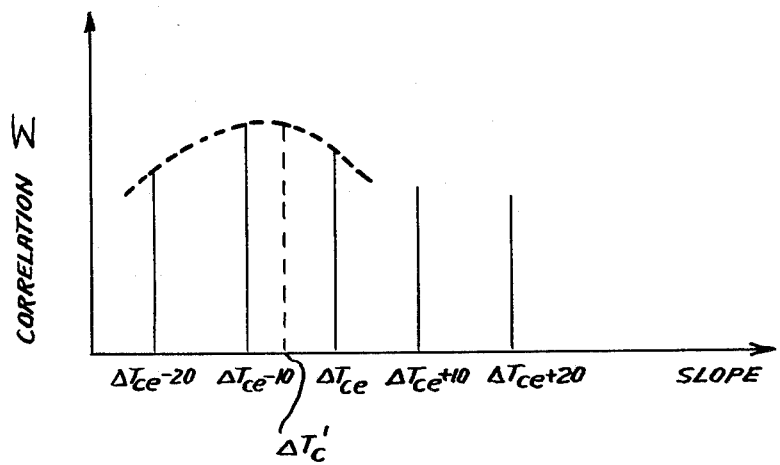
FIG. 9 illustrates a technique for obtaining the slope or velocity which yields a maximum correlation.
Figure 8B:
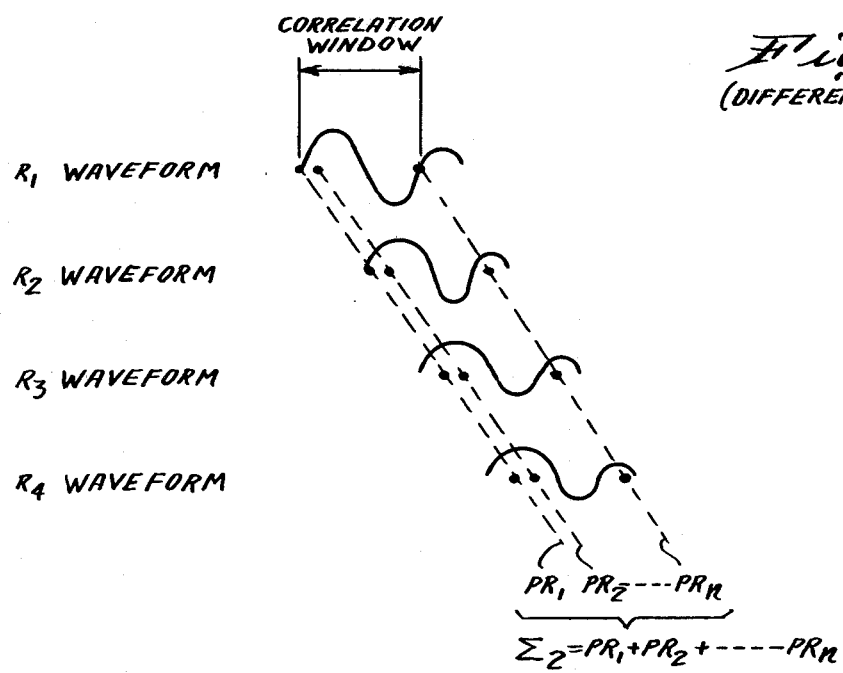

A different estimated slope is next assumed (diamond 708 and block 709 of FIG. 7), and the procedure for obtaining $\Sigma$ (in this case designated $\Sigma_2$) is repeated for the new assumed slope. FIG. 8B illustrates the manner in which $\Sigma_2$ is obtained using a slope which is different than that of FIG. 7A. The number of different slopes which are tried is a matter of choice and, in the present embodiment, five different slopes are used to obtain five values of $\Sigma$, e.g. $\Sigma_1$ through $\Sigma_5$. The five slopes utilized are: $\Delta T_{ce}$ (the originally assumed slope, rounded off to the nearest multiple of the sampling rate); $\Delta T_{ce} + 10\mu s$; $\Delta T_{ce} - 10\mu s$; $\Delta T_{ce} + 20\mu s$; and $\Delta T_{ce} - 20\mu s$, the ten microsecond multiples being multiples of the sampling rate. The optimum slope can then be determined as a slope at which $\Sigma$ is a maximum. In the present embodiment, an interpolation technique is preferably utilized to obtain the optimum slope, designated as $\Delta T'_c$ (block 710 of FIG. 7). This may be done by fitting a second order polynomial through the largest value of $\Sigma$ and the two adjacent values of $\Sigma$. An example of the technique is illustrated in FIG. 9 wherein the maximum of the polynomial curve, selected as $\Delta T'_c$, is determined, in a given case, to be between $\Delta T_{ce} - 10\mu s$ and $\Delta T_{ce}$, as shown by the dashed line. In the event that the maximum value of $\Sigma$ is found to be at one of the assumed slope extremes (viz., at either $\Delta T_{ce} - 20\mu s$ or $\Delta T_{ce} + 20\mu s$), diamond 711 of FIG. 7 causes block 712 to be entered via diamond 711. The slope is then incremented toward the direction of the extreme and the same procedure is followed. Eventually, either an appropriate maximum is obtained (called $\Delta T'_c$ in this case) or a "yes" answer to decision diamond 712 indicates that the attempt at obtaining $\Delta T'_c$ has been unsuccessful.

Referring again to FIG. 4, decision diamond 130 is next entered and, if a value of $\Delta T'_c$ has been successfully obtained (routine of block 120), diamond 130 causes entry to another decision diamond 135. If, however, a value of $\Delta T'_c$ was not successfully obtained the block 160 is entered. In accordance with the criterion of diamond 135, $\Delta T'_c$ is tested as against the value of $\Delta T'_c$ obtained at the previous depth level (except, of course, where this is the first depth level being processed whereupon suitable provision is made for bypassing diamond 135), to determine if the value of $\Delta T'_c$ at the present depth level is within a particular range, for example 10μs, of the value of $\Delta T'_c$ which had been obtained at the previous depth level. If the test result is affirmative, the block 140 is entered, this block representing the acceptance of the value $\Delta T'_c$, the accepted value being an output value designated as $\Delta T_c$ (e.g. curve 43 of FIG. 1). If, however, the answer to the inquiry or diamond 135 is negative, diamond 145 is entered and inquiry is made as to whether $\Delta T'_c$ has been rejected (in accordance with the criterion of diamond 135) for five depth levels in a row. If not, block 160 is entered, this block representing the adoption of a $\Delta T_c$ for this depth level which is the same as the one from the previous depth level. The block 160, it is seen, is also directly entered from the negative output line of decision diamond 130; i.e. the situation where the attempted determination of $\Delta T'_c$ was unsuccessful.

Having established an output value of $\Delta T_c$ for this particular depth level, an initial estimate is next made of the shear wave velocity or slope, this estimated value being designated as $\Delta T_{se}$. In the present embodiment, the initial estimated slope or velocity of the shear wave is computed as:

$$\Delta T_{se} = 1.35 \, \Delta T_c + 3 \text{ (sampling rate)}$$

as indicated by block 150 of FIG. 4. Thus, if, as above, the sampling rate is selected as 10 μsec the estimated velocity of slope of the shear wave would be:

$$\Delta T_{se} = 1.35 \, \Delta T_c + 30 \, \mu sec/ft.$$

Block 156 is then entered and a lower limit of the shear wave velocity or slope, designated $\Delta T_{SLL}$, is computed. In the present embodiment, this lower limit, to be used in a manner described below in rejecting any values of shear wave velocity below the lower limit, is selected as being 1.5 $\Delta T_c$, as indicated by the block 156.

The next portion of the flow chart is, in the present embodiment, concerned with movement along the time scale of the $R_1$ waveform until such time when useful information concerning the shear wave velocity of slope can be expected. The portion of the $R_1$ waveform used in the previously described correlation is stripped away (block 165); i.e., the time reference is moved forward to the rightmost end point of the previously utilized correlation window. From this point in time, a "first motion" detection is again performed (as described above), as represented by the block 170. The nearest zero crossing is then detected, and the beginning of the correlation window is moved to the time of zero crossing detection, as represented by the block 175. The correlation window size is then adjusted to encompass one full cycle of the waveform, e.g. by setting the far end thereof at the second zero crossing past the beginning thereof. The time of occurrence of the latest first motion detection is next compared (diamond 180) against a maximum allowable time, designated $T_w$, which represents the approximate expected arrival time of the water or mud waves, the value $T_w$ being selected based on the transmitter-receiver spacing and an assumed water velocity of about 200 μs per foot. If $T_w$ is exceeded (of course, it is unlikely that it will be expected during an early pass through the loop being described), a meaningful value of shear velocity is unlikely to be obtained at this depth level, and diamond 240, described below, is entered. Decision diamond 190 is next entered and the index r (originally set to unity—block 116 above, and incremented via block 185) is tested to see if it is greater than or equal to K, where K is the number of waveform cycles to be skipped, for example five cycles, from the original cycle which had been used to determine the compressional velocity or slope. This inquiry is represented by the diamond 190. If the answer is in the negative, block 195 is entered, this block representing essentially the same function as the block 165 above; viz., of stripping away the $R_1$ waveform within the present correlation window. Block 170 is then re-entered and, by action of the functions of blocks 170 and 175, the beginning of the correlation window is then moved to the zero crossing closest to the next first motion, and the size of the correlation window is readjusted, as previously described. This action continues, in the loop designated by reference numeral 199, until the requisite number of cycles (e.g. five cycles) have been skipped over. The primary purpose of loop 199, in the present embodiment, is to save processing time since it is not generally expected that meaningful shear arrivals will occur within five cycles of the first strong compressional cycle. However, it will be understood that, if desired, the technique to be subsequently described for determination of shear wave velocity or slope could be initiated directly after the output value of compressional velocity or slope is determined.

When the requisite number of cycles have been skipped, block 200 is entered and a fourfold correlation is performed with respect to the present correlation window. The fourfold correlation was described above in conjunction with block 120 of FIG. 4 and, in further detail, in conjunction with the flow chart of FIG. 7. In the case of block 200, the initial estimated value of shear wave velocity or slope, designated $\Delta T_{se}$, is as derived above in conjunction with block 150. In other respects, the correlation may be the same as described with reference to FIG. 7, with $\Sigma$ values being obtained at 10 $\mu$s spacings of slope and an interpolation being utilized to obtain a resultant provisional velocity or slope. In this case, the result is a provisional value for shear wave velocity or slope, designated as $\Delta T_{sm}'$. Since m had been initially set at unity (block 116), this is a first provisional value of shear velocity or slope, i.e. $\Delta T_{sm}'$.

Decision diamond 205 is next entered and the provisional value of shear wave velocity or slope (the first provisional value for the first pass through) is tested against the lower limit for shear wave velocity or slope (established above—block 156) as represented by the decision diamond 205. If $\Delta T_{sm}'$ is not below this lower limit, decision diamond 210 is entered and $\Delta T_{sm}'$ is tested as against the expected velocity of the mud or water waves, $\Delta T_w$, which is typically about 200$\mu$ seconds. If $\Delta T_{sm}'$ does not exceed $\Delta T_w$, block 215 is entered, this block representing the acceptance of $\Delta T_{sm}'$ as an acceptable provisional value of shear wave velocity or slope, designated $\Delta T_{sm}$. In other words, removal of the prime from $\Delta T_{sm}'$ designates that it is within a range which makes it a feasible value for further consideration. The diamond 220 is then entered and $\Delta T_{sm}$ is tested as against the value of shear wave velocity or slope which had been determined at the previous depth level. In the present embodiment, if $\Delta T_{sm}$ is within 5 $\mu$s of the previously stored value of shear wave velocity or slope, then the value $\Delta T_{sm}$ is accepted (block 225) as the output shear wave velocity or slope at this depth level, designated as $\Delta T_s$. If, however, $T_{sm}$ is not within 5 $\mu$s of the output value at the previous depth level, diamond 230 is entered and inquiry is made as to whether a particular number of values of $T_{sm}$ have now been obtained at the current depth level. In the present embodiment, the particular number utilized is four. Thus, if four provisional values, $T_{sm}$, have not yet been obtained, block 235 is entered, this block also being entered, as can be seen from the diagram, when the tests of diamonds 205 or 210 had indicated that $T_{sm}'$ was outside the acceptable range (as previously described).

In accordance with the function represented by the block 235, the beginning cycle of the $R_1$ waveform used in the most recent correlation is stripped away. Block 170 is then re-entered, via block 171, which represents the incrementing of index m, and operation of blocks 170 and 175 establish the new position of the correlation window with respect to the $R_1$ waveform. This effectively means that both ends of the correlation window are advanced to the next zero crossing and the new correlation window overlaps the previous correlation window by one-half cycle. Testing against $T_w$ is then performed (diamond 180), but the loop 199 skipping routine is now ineffective since index r exceeds the maximum (diamond 190). Block 200 is then entered with a resultant fourfold correlation which yields the next provisional value of shear wave velocity or slope, $\Delta T_{sm}'>$ which is $\Delta T_{s2}'$ in this example. The criteria of blocks 205 through 230 are next applied as previously set forth.

The described procedure continues until either an output value of $\Delta T_s$ is obtained by operation of the block 225, until four provisional values $\Delta T_{sm}$ have been obtained (an affirmative answer to the inquiry of diamond 230), or until the water arrival time $T_w$ is exceeded (diamond 180). In each case, diamond 240 is entered and inquiry is made as to whether or not there is an accepted value $\Delta T_s$. If not, block 245 is entered, this block representing the selection of $\Delta T_s$ as the value of $\Delta T_{sm}$ which is nearest to the value of $\Delta T_s$ that had been determined at the previous depth level. Block 250 is then entered (block 250 also being entered from the affirmative answer branch of diamond 240), this block representing the recording of the predetermined values of $\Delta T_c$ and $\Delta T_s$ for the present depth level. Block 110, at the beginning, is then re-entered and the technique is repeated for the next depth level.

In the embodiment set forth in conjunction with FIG. 4, a plurality of provisional shear wave velocities are developed and an output shear wave velocity is determined as a function of the provisional shear wave velocities. (An exception in this embodiment is when a particular provisional shear wave velocity is sufficiently close to the value at the previous depth level whereupon it is immediately accepted.) Each of these provisional shear wave velocities is determined by correlating relatively small portions of the waveforms over a limited range of slopes (of the order of 50 $\mu$s), so prior art problems associated with multiple correlation peaks, that might occur using longer waveforms and wider slope ranges, are minimized. Also, individual portions of the waveform containing spurious information have less tendency to upset the selection of accurate output values since, in the described embodiment, selection is from among a plurality of provisional values and an individual spurious value is likely to be discraded without affecting the output values. The comparison of provisional velocity values (both shear and compressional) to the values obtained at the previous depth level provides a degree of protection against spurious perturbations in the output graphs, but genuine abrupt changes in formation characteristics (such as at a bed boundary) will be properly indicated within a few depth level increments since the technique allows for abrupt modifications which appear genuine (e.g. diamonds 145 and 220, 230).

It will be understood that the technique of the invention of obtaining an output shear wave velocity from among individual provisional shear wave velocities obtained by correlating individual relatively short portions of the waveforms can be applied equally well to determination of an output compressional wave velocity.

Figure 10:
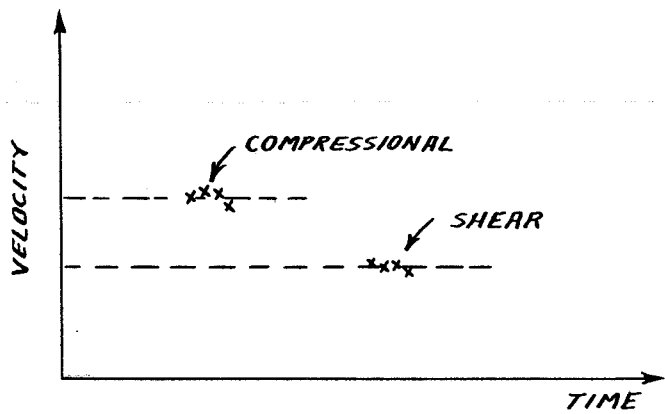
FIG. 10 is a plot of provisional compressional velocity values and provisional shear velocity values at a particular depth level.

The invention has been described with reference to a particular embodiment, but variations within the spirit and scope of the invention will occur to those skilled in the art. For example, the provisional velocity values can be utilized, in the case of both compressional and shear wave velocity determination, without the need for utilizing information from the previously processed depth level, to arrive at a decision concerning velocity at the depth level being processed. In fact, the present invention has been found to operate advatageously in situations where prior art techniques exhibited inability to track shear or through casing signals arrivals when continuity of these arrivals is absent. It will be understood that alternate techniques for rendering a decision, using the provisional velocity values obtained with the technique of the invention, can be set forth. For example, FIG. 10 illustrates the provisional compressional velocity values and provisional shear velocity values obtained at a particular depth level. The resultant "clusters" of values can be used to render a decision concerning an output compressional and/or shear wave velocity graphically, or alternative automotive techniques can be employed. In FIG. 3, there is shown a plot of shear velocity versus depth which is similar to the one of FIG. 1, but wherein the range of provisional values obtained at each depth level also appear in the plot in the form of a vertical line, at each depth level, which indicates the range of provisional values obtained. For example, the dashed block 101 in FIG. 4 and the loop 102 associated therewith could be used to repeat the compressional velocity-determining correlation of block 120 for different individual cycles (which may or may not overlap) near the beginning of the $R_1$ waveform (instead of saving time by skipping through these cycles as described in conjunction with the loop 199). In such case, a plurality of provisional compressional wave velocities would be determined and an output compressional wave velocity may be obtained from these provisional values as is the case for the output shear wave velocity determination. Also, it will be understood that alternative relatively short portions of the waveforms, such as two cycle portions, could be used for the correlations. Alternate correlation techniques can also be employed, consistent with the principles of the invention.

I claim:

1. Apparatus for determining the velocity of acoustic wave energy propagating in formations surrounding a borehole, comprising:
   means positioned in said borehole for establishing acoustic wave energy in said formations;
   means for receiving the acoustic wave energy at a plurality of spaced locations in the borehole;
   means for deriving a plurality for signals respectively representative of the wave energy received at said plurality of spaced locations in the borehole;
   means for correlating a first portion of the signal from one of said locations with first portions of signals from the other locations, the first portions of the signals from the other locations being determined from an assumed velocity, said correlating being performed for a number of different assumed velocities to obtain a resultant first provisional velocity;
   means for correlating a second portion of the signal from said one of said locations with second portions of signals from the other locations, the second portions of the signals from the other locations being determined from an assumed velocity, said correlating of second portions being performed for a number of different assumed velocities to obtain a resultant second provisional velocity; and
   means for generating an output velocity as a function of said first and second provisional velocities.

2. Apparatus as defined by claim 1 wherein said first and second portions of the signals are compressional wave components and the output velocity is an output compressional wave velocity.

3. Apparatus as defined by claim 1 wherein said first and second portions of the signals are shear wave components and the output velocity is an output shear wave velocity.

4. Apparatus as defined by claim 1 wherein said first and second portions each have a duration of substantially an intergral number of half-cycles, not exceeding two full cycles, of the signal from said one location.

5. Apparatus as defined by claim 1 wherein said output velocity is determined for each of a number of adjacent depth levels.

6. Apparatus as defined by claim 5 wherein said generated output velocity takes into account the output velocity previously generated at an adjacent depth level.

7. Apparatus as defined by claim 4 wherein said output velocity is determined for each of a number of adjacent depth levels.

8. Apparatus as defined by claim 7 wherein said generated output velocity takes into account the output velocity previously generated at an adjacent depth level.

9. Apparatus for determining the compressional wave velocity and the shear wave velocity of acoustic wave energy propagating in formations surrounding a borehole, comprising:
   source means positioned in said borehole for establishing acoustic wave energy in said formations;
   means for receiving the acoustic wave energy at a plurality of at least four spaced locations in the borehole;
   means for deriving a plurality of signals respectively representative of the wave energy received at said plurality of spaced locations in the borehole;
   means for correlating a first portion of the signal from the location closest to said source means with a first portion of each of the signals from the other locations, said first portions of the signals from the other locations being determined from an assumed compressional wave velocity, said correlation being performed for a number of different assumed compressional wave velocities, the assumed velocity which yields substantially the maximum correlation being selected as an output compressional wave velocity;

means for correlating a second later-occurring portion of the signal from said closest location with second portions of each of the signals from the other locations, the second portions of the signals from the other locations being determined from an assumed shear wave velocity, said correlating of second portions being performed for a number of different assumed shear wave velocities, the assumed velocity which yields substantially the maximum correlation of second portions being selected as a first provisional shear wave velocity;

means for correlating a third later-occurring portion of the signal from said closest location with third portions of each of the signals from the other locations, the third portions of the signals from the other locations being determined from an assumed shear wave velocity, said correlation of third portions being performed for a number of different assumed shear wave velocities, the assumed velocity which yields substantially the maximum correlation of third portions being selected as a second provisional shear wave velocity; and means for generating an output shear wave velocity as a function of said first and second provisional shear wave velocities.

10. Apparatus as defined by claim 9 wherein said first, second and third portions each have a duration of substantially an integral number of half-cycles, not exceeding two full cycles, of the signal from said closest location.

11. Apparatus as defined by claim 9 wherein said output velocities are determined for each of a number of adjacent depth levels.

12. Apparatus as defined by claim 11 wherein said generated output shear wave velocity takes into account the output shear wave velocity previously generated at an adjacent depth level.

13. Apparatus as defined by claim 10 wherein said output velocities are determined for each of a number of adjacent depth levels.

14. Apparatus as defined by claim 13 wherein said generated output shear wave velocity takes into account the output shear wave velocity previously generated at an adjacent depth level.

15. Apparatus as defined by claim 11 wherein said generated output compressional wave velocity takes into account the compressional wave velocity previously generated at an adjacent depth level.

16. Apparatus as defined by claim 12 wherein said generated output compressional wave velocity takes into account the compressional wave velocity previously generated at an adjacent depth level.

17. Apparatus as defined by claim 14 wherein said generated output compressional wave velocity takes into account the compressional wave velocity previously generated at an adjacent depth level.

18. Apparatus for determining the velocity of acoustic wave energy propagating in formations surrounding a borehole, comprising:

means for deriving a plurality of signals respectively representative of acoustic wave energy received at a plurality of locations in the borehole spaced from a source of acoustic wave energy;

means for correlating a first portion of the signal from one of said locations with first portions of signals from the other locations, the first portions of the signals from the other locations being determined from an assumed velocity, said correlating being performed for a number of different assumed velocities to obtain a resultant first provisional velocity;

means for correlating a second portion of the signal from said one of said locations with second portions of signals from the other locations, the second portions of the signals from the other locations being determined from an assumed velocity, said correlating of second portions being performed for a number of different assumed velocities to obtain a resultant second provisional velocity; and means for generating an output velocity as a function of said first and second provisional velocities.

19. Apparatus as definded by claim 18 wherein said first and second portions of the signals are compressional wave components and the output velocity is an output compressional wave velocity.

20. Apparatus as defined by claim 18 wherein said first and second portions of the signals are shear wave components and the output velocity is an output shear wave velocity.

21. Apparatus as defined by claim 18 wherein said first and second portions each have a duration of substantially an integral number of half-cycles, not exceeding two full cycles, of the signal from said one location.

22. Apparatus as defined by claim 18 wherein said output velocity value is determined for each of a number of adjacent depth levels.

23. Apparatus as defined by claim 22 wherein said generated output velocity value takes into account the output velocity previously generated at an adjacent depth level.

24. Apparatus as defined by claim 21 wherein said output velocity value is determined for each of a number of adjacent depth levels.

25. Apparatus as defined by claim 24 wherein said generated output velocity value takes into account the output velocity previously generated at an adjacent depth level.

26. Apparatus for determining the compressional wave velocity and the shear wave velocity of acoustic wave energy propagating in formations surrounding a borehole, comprising:

means for deriving a plurality of at least four signals respectively representative of the wave energy received at a plurality of at least four locations in the borehole spaced from a source of acoustic wave energy;

means for correlating a first portion of the signal from the location closest to said source with a first portion of each of the signals from the other locations, said first portions of the signals from the other locations being determined from an assumed compressional wave velocity, said correlation being performed for a number of different assumed compressional wave velocities, the assumed velocity which yields substantially the maximum correlation being selected as an output compressional wave velocity;

means for correlating a second later-occurring portion of the signal from said closest location with second portions of each of the signals from the other locations, the second portions of the signals from the other locations being determined from an assumed shear wave velocity, said correlating of second portions being performed for a number of different assumed shear wave velocities, the assumed velocity which yields substantially the maximum correlation of second portions being selected as a first provisional shear wave velocity;

means for correlating a third later-occurring portion of the signal from said closest location with third portions of each of the signals from the other locations, the third portions of the signals from the other locations being determined from an assumed shear wave velocity, said correlating of third portions being performed for a number of different assumed shear wave velocities, the assumed velocity which yields substantially the maximum correlation of third portions being selected as a second provisional shear wave velocity; and means for generating an output shear velocity as a function of said first and second provisional output velocities.

27. Apparatus as defined by claim 26 wherein said first, second and third portions each have a duration of substantially an integral number of half-cycles, not exceeding two full cycles, of the signal from said one location.

28. Apparatus as defined by claim 26 wherein said output velocities are determined for each of a number of adjacent depth levels.

29. Apparatus as defined by claim 28 wherein said generated output shear wave velocity takes into account the output shear wave velocity previously generated at an adjacent depth level.

30. Apparatus as defined by claim 27 wherein said output velocities are determined for each of a number of adjacent depth levels.

31. Apparatus as defined by claim 30 wherein said generated output shear wave velocity takes into account the output shear wave velocity previously generated at an adjacent depth level.

32. Apparatus as defined by claim 28 wherein said generated output compressional wave velocity takes into account the compressional wave velocity previously generated at an adjacent depth level.

33. Apparatus as defined by claim 29 wherein said generated output compressional wave velocity takes into account the compressional wave velocity previously generated at an adjacent depth level.

34. Apparatus as defined by claim 31 wherein said generated output compressional wave velocity takes into account the compressional wave velocity previously generated at an adjacent depth level.

35. A method for determining the velocity of acoustic wave energy propagating in formations surrounding a borehole, comprising the steps of:

establishing acoustic wave energy in said formations;

receiving the acoustic wave energy at a plurality of spaced locations in the borehole;

deriving a plurality of signals respectively representative of the wave energy received at said plurality of spaced locations in the borehole;

correlating a first portion of the signal from one of said locations with first portions of signals from the other locations, the first portions of the signals from the other locations being determined from an assumed velocity, said correlating being performed for a number of different assumed velocities to obtain a resultant first provisional velocity;

correlating a second portion of the signal from said one of said locations with second protions of signals from the other locations, the second portions of the signals from the other locations being determined from an assumed velocity, said correlating of second portions being performed for a number of different assumed velocities to obtain a resultant second provisional velocity; and generating an output velocity as a function of said first and second provisional velocities.

36. The method as defined by claim 35 wherein said first and second portions of the signals are compressional wave components and the output velocity is an output compressional wave velocity.

37. The method as defined by claim 35 wherein said first and second portions of the signals are shear wave components and the output velocity is an output shear wave velocity.

38. The method as defined by claim 35 wherein said first and second portions each have a duration of substantially an integral number of half-cycles, not exceeding two full cycles, of the signal from said one location.

39. The method as defined by claim 35 wherein said output velocity is determined for each of a number of adjacent depth levels.

40. The method as defined by claim 39 wherein said generated output velocity takes into account the output velocity previously generated at an adjacent depth level.

41. The method as defined by claim 38 wherein said output velocity is determined for each of a number of adjacent depth levels.

42. The method as defined by claim 41 wherein said generated output velocity takes into account the output velocity previously generated at an adjacent depth level.

43. A method for determining the compressional wave velocity and the shear wave velocity of acoustic wave energy propagating in formations surrounding a borehole, comprising the steps of:

establishing acoustic wave energy in said formations;

receiving the acoustic wave energy at a plurality of at least four spaced locations in the borehole;

deriving a plurality of signals respectively representative of the wave energy received at said plurality of spaced locations in the borehole;

correlating a first portion of the signal from the location closest to said source with a first portion of each of the signals from the other locations, said first portions of the signals from the other locations being determined from an assumed compressional wave velocity, said correlation being performed for a number of different assumed compressional wave velocities, the assumed velocity which yields substantially the maximum correlation being selected as an output compressional wave velocity;

correlating a second later-occurring portion of the signal from said closest location with second portions of each of the signals from the other locations, the second portions of the signals from the other locations being determined from an assumed shear wave velocity, said correlating of second portions being performed for a number of different assumed shear wave velocities, the assumed velocity which yields substantially the maximum correlation of second portions being selected as a first provisional shear wave velocity;

correlating a third later-occurring portion of the signal from said closest location with third portions of each of the signals from the other locations, the third portions of the signals from the other locations being determined from an assumed shear wave velocity, said correlating of third portions being performed for a number of different assumed shear wave velocities, the assumed velocity which yields substantially the maximum correlation of third portions being selected as a second provisional shear wave velocity; and generating an output shear wave velocity as a function of said first and second provisional shear wave velocities.

44. The method as defined by claim 43 wherein said first, second and third portions each have a duration of substantially an integral number of half-cycles, not exceeding two full cycles of the signal from said closest location.

45. The method as defined by claim 43 wherein said output velocities are determined for each of a number of adjacent depth levels.

46. The method as defined by claim 45 wherein said generated output shear wave velocity takes into account the output shear wave velocity previously generated at an adjacent depth level.

47. The method as defined by claim 44 wherein said output velocities are determined for each of a number of adjacent depth levels.

48. The method as defined by claim 47 wherein said generated output shear wave velocity takes into account the output shear wave velocity previously generated at an adjacent depth level.

49. The method as defined by claim 45 wherein said generated output compressional wave velocity takes into account the compressional wave velocity previously generated at an adjacent depth level.

50. The method as defined by claim 46 wherein said generated output compressional wave velocity takes into account the compressional wave velocity previously generated at an adjacent depth level.

51. The method as defined by claim 48 wherein said generated output compressional wave velocity takes into account the compressional wave velocity previously generated at an adjacent depth level.

52. A method for determining the velocity of acoustic wave energy propagating in formations surrounding a borehole, comprising the steps of:

deriving a plurality of signals respectively representative of acoustic wave energy received at a plurality of locations in the borehole spaced from a source of acoustic wave energy;

correlating a first portion for the signal from one of said locations with first portions of signals from the other locations, the first portions of the signals from the other locations being determined from an assumed velocity, said correlating being performed for a number of different assumed velocities to obtain a resultant first provisional velocity;

correlating a second portion of the signal from said one of said locations with second portions of signals from the other locations, the second portions of the signals from the other locations being determined from an assumed velocity, said correlating of second portions being performed for a number of different assumed velocities to obtain a resultant second provisional velocity; and generating an output velocity as a function of said first and second provisional velocities.

53. The method as defined by claim 52 wherein said first and second portions of the signals are compressional wave components and the output velocity is an output compressional wave velocity.

54. The method as defined by claim 52 wherein said first and second portions of the signals are shear wave components and the output velocity is an output shear wave velocity.

55. The method as defined by claim 52 wherein said first and second portions each have a duration of substantially an integral number of half-cycles, not exceeding two full cycles, of the signal from said one location.

56. The method as defined by claim 52 wherein said output velocity is determined for each of a number of adjacent depth levels.

57. The method as defined by claim 56 wherein said generated output velocity takes into account the output velocity previously generated at an adjacent depth level.

58. A method for determining the compressional wave velocity and shear wave velocity of acoustic wave energy propagating in formations surrounding a borehole, comprising the steps of:

providing an acoustic source in said borehole to establish acoustic wave energy in the formations surrounding the borehole;

receiving the acoustic wave energy at a plurality of at least four spaced locations in the borehole;

deriving a plurality of signals respectively representative of the wave energy received at said plurality of locations;

correlating a first portion of the signals from one of said locations with first portions of signals from the other locations, the first portions of the signals from the other locations being determined from an assumed velocity, the correlating being performed for a number of different assumed velocities to obtain a resultant output compressional wave velocity;

correlating a second substantially later-occurring portion of the signal from said one of said locations with second portions of the signals from the other locations, the second portions of the signals from the other locations being determined from an assumed velocity, the correlating being performed for a number of different assumed velocities to obtain a resultant first provisional shear wave velocity;

correlating a third portion of the signal from said one of said locations with third portions of the signals from the other locations, the third portions of the signals from the other locations being determined from an assumed velocity, and the correlating being performed for a number of different assumed velocities to obtain a resultant second provisional shear wave velocity; and generating an output shear wave velocity as a function of the first and second provisional shear wave velocities.

59. The method as defined by claim 58 wherein said first portion of said signal from one of said locations is substantially an integral number of half-cycles of said signal.

60. The method as defined by claim 59 wherein said second and third portions of said signal are substantially equal in duration to the first portion.

61. The method as defined by claim 58 wherein output velocity values are determined for each of a number of adjacent depth levels.

62. The method as defined by claim 60 wherein output velocity values are determined for each of a number of adjacent depth levels.

63. The method as defined by claim 61 wherein the output velocity values are selected taking into account the output velocity values previously generated at an adjacent depth level.

64. The method as defined by claim 62 wherein the output velocity values are selected taking into account the output velocity values previously generated at an adjacent depth level.

65. Apparatus for determining the velocities of different modes of propagation of acoustic wave energy propagating in formations surrounding a borehole, comprising:
- means positioned in said borehole for establishing acoustic wave energy in said formations;
- means for receiving the acoustic wave energy at a plurality of spaced locations in the borehole;
- means for deriving a plurality of signals respectively representative of the wave energy received at said plurality of spaced locations in the borehole;
- means for identifying the location and duration of a first characteristic portion of the signal from one of said locations;
- means for correlating said first portion of the signal from said one of said locations with first portions of signals from the other locations, the first portions of the signals from the other locations being determined from an assumed velocity, said correlating being performed for a number of different assumed velocities to obtain a resultant first provisional velocity;
- means for identifying subsequent characteristic portions of the signal from said one of said locations;
- means for correlating said subsequent portions of the signal from said one of said locations with subsequent portions of signals from the other locations, the subsequent portions of the signals from the other locations being determined from assumed velocities, said correlating of each of said subsequent portions being performed for a number of different assumed velocities to obtain resultant further provisional velocities; and
- means for generating output velocities of said different modes of propagation as a function of said first provisional velocity and said subsequent provisional velocities.

66. Apparatus as defined by claim 65 wherein said first portions of the signals are compressional wave components, the subsequent portions of the signals are shear wave components, and said output velocities are compressional and shear velocities.

67. Apparatus as defined by claim 66 wherein said first and subsequent portions each have a duration of substantially an integral number of half-cycles, not exceeding two full cycles, of said compressional and shear wave components, respectively.

68. Apparatus as defined by claim 65 wherein said output velocities are determined for each of a number of adjacent depth levels.

69. Apparatus as defined by claim 67 wherein said output velocities are determined for each of a number of adjacent depth levels.

70. Apparatus as defined by claim 68 wherein said generated output velocities are also a function of the output velocities previously generated at an adjacent depth level.

71. Apparatus as defined by claim 69 wherein said generated output velocities are also a function of the output velocities previously generated at an adjacent depth level.

72. Apparatus for determining the compressional wave velocity and the shear wave velocity of acoustic wave energy propagating in formations surrounding a borehole, comprising:
- source means positioned in said borehole for establishing acoustic wave energy in said formations;
- means for receiving the acoustic wave energy at a plurality of at least four spaced locations in the borehole;
- means for deriving a plurality of signals respectively representative of the wave energy received at said plurality of spaced locations in the borehole;
- means for identifying the location and duration of a first characteristic portion of the signal from the location closest to said source means;
- means for correlating said first portion of the signal from said closest location with a first portion of each of the signals from the other locations, said first portions of the signals from the other locations being determined from an assumed compressional wave velocity, said correlation being performed for a number of different assumed compressional wave velocities, the assumed velocity which yields substantially the maximum correlation being selected as an output compressional wave velocity;
- means for identifying subsequent characteristic portions of the signals from said closest location;
- means for correlating said subsequent portions of the signal from said closest location with subsequent portions of each of the signals from the other locations, the subsequent portions of the signals from the other locations being determined from assumed shear wave velocities, said correlating of each of said subsequent portions being performed for a number of different assumed shear wave velocities, the assumed velocities which yield substantially the maximum correlations of said subsequent portions being selected as provisional shear wave velocities; and
- means for generating an output shear wave velocity as a function of said provisional shear wave velocities.

73. Apparatus as defined by claim 72 wherein said first and subsequent portions each have a duration of substantially an integral number of half-cycles, not exceeding two full cycles, of said compressional and shear wave components, respectively.

74. Apparatus as defined by claim 73 wherein said output velocities are determined for each of a number of adjacent depth levels.

75. Apparatus as defined by claim 74 wherein said generated output shear wave velocity is also a function of the output shear wave velocity previously generated at an adjacent depth level.

76. An acoustic logging apparatus for determining the velocity of acoustic wave energy propagating in formations surrounding a borehole, comprising:
- an elongated support member movable through said borehole;
- an acoustic transmitter mounted on said support member for establishing acoustic wave energy in said formations;
- a plurality of acoustic receivers mounted in spaced relation on said support member;

means for deriving a plurality of signals respectively representative of the acoustic wave energy received at said plurality of acoustic receivers;

means for correlating a first portion of the signal from one of said receivers with first portions of signals from the other receivers, the first portions of the signals from the other receivers being determined from an assumed velocity, said correlating being performed for a number of different assumed velocities to obtain a resultant first provisional velocity;

means for correlating a second portion of the signal from said one of said receivers with second portions of signals from the other receivers, the second portions of the signals from the other receivers being determined from an assumed velocity, said correlating of second portions being performed for a number of different assumed velocities to obtain a resultant second provisional velocity;

means for generating an output velocity as a function of said first and second provisional velocities;

means for recording said output velocity as a function of said first and second provisional velocities; and means for recording said output velocity in graphical form.

77. Apparatus as defined by claim 76 wherein said first and second portions of the signals are compressional wave components and the output velocity is an output compressional wave velocity.

78. Apparatus as defined by claim 76 wherein said first and second portions of the signals are shear wave components and the output velocity is an output shear wave velocity.

79. Apparatus as defined by claim 76 wherein said first and second portions each have a duration of substantially an integral number of half-cycles, not exceeding two full cycles, of the signal from said one receiver.

80. Apparatus as defined by claim 76 wherein said output velocity is determined and recorded in graphical form for each of a number of adjacent depth levels.

81. Apparatus as defined by claim 80 wherein said generated output velocity takes into account the output velocity previously generated at an adjacent depth level.

82. Apparatus as defined by claim 79 wherein said output velocity is determined and recorded in graphical form for each of a number of adjacent depth levels.

83. Apparatus as defined by claim 82 wherein said generated output velocity takes into account the output velocity previously generated at an adjacent depth level.

84. An acoustic logging apparatus for determining the compressional wave velocity and the shear wave velocity of acoustic wave energy propagating in formations surrounding a borehole, comprising:

an elongated support member movable through said borehole;

an acoustic transmitter mounted on said support member for establishing acoustic wave energy in said formations;

a plurality of acoustic receivers mounted in spaced relation of said support member; means for deriving a plurality of signals respectively representative of the acoustic wave energy received at said plurality of acoustic receivers;

means for correlating a first portion of the signal from the receiver closest to the transmitter with a first portion of each of the signals from the other receivers, said first portions of the signals from the other receivers being determined from an assumed compressional wave velocity, said correlation being performed for a number of different assumed compressional wave velocities, the assumed velocity which yields substantially the maximum correlation being selected as an output compressional wave velocity;

means for correlating a second later-occurring portion of the signal from said closest receiver with second portions of each of the signals from the other receivers, the second portions of the signals from the other receivers being determined from an assumed shear wave velocity, said correlating of second portions being performed for a number of different assumed shear wave velocities, the assumed velocity which yields substantially the maximum correlation of second portions being selected as a first provisional shear wave velocity;

means for correlating a third later-occurring portion of the signal from said closest receiver with third portions or each of the signals from the other receivers, the third portions of the signals from the other receivers being determined from an assumed shear wave velocity, said correlation of third portions being performed for a number of different assumed shear wave velocities, the assumed velocity which yields substantially the maximum correlation of third portions being selected as a second provisional shear wave velocity;

means for generating an output shear wave velocity as a function of said first and second shear wave velocities; and means for recording said output compressional wave velocity and said output shear wave velocity in graphical form.

85. Apparatus as defined by claim 84 wherein said first, second and third portions each have a duration of substantially an integral number of half-cycles, not exceeding two full cycles, of the signal from said closest receiver.

86. Apparatus as defined by claim 84 wherein said output velocities are determined and recorded in graphical form for each of a number of adjacent depth levels.

87. Apparatus as defined by claim 86 wherein said generated output shear wave velocity takes into account the output shear wave velocity previously generated at an adjacent depth level.

88. Apparatus as defined by claim 85 wherein said output velocities are determined and recorded in graphical form for each of a number of adjacent depth levels.

89. Apparatus as defined by claim 88 wherein said generated output shear wave velocity takes into account the output shear wave velocity previously generated at an adjacent depth level.

90. Apparatus as defined by claim 86 wherein said generated output compressional wave velocity takes into account the compressional wave velocity previously generated at an adjacent depth level.

91. Apparatus as defined by claim 87 wherein said generated output compressional wave velocity takes into account the compressional wave velocity previously generated at an adjacent depth level.

92. Apparatus as defined by claim 89 wherein said generated output compressional wave velocity takes into account the compressional wave velocity previously generated at an adjacent depth level.

93. For use in an acoustic logging technique wherein acoustic wave energy is established in formations surrounding a borehole and received at a plurality of spaced locations in the borehole, a method for converting a plurality of time varying recordings of signals representative of wave energy received at said plurality of spaced locations into a depth varying recording of the velocity of acoustic wave energy propagating in said formations, comprising the steps of:

generating, at each depth level, a plurality of time varying recordings of signals repectively representative of the wave energy received at said plurality of spaced locations in the borehole;

correlating, at each depth level, a first portion of the signal from one of said locations with first portions of signals from the other locations, the first portions of the signals from the other locations being determined from an assumed velocity, said correlating being performed for a number of different assumed velocities to obtain a resultant first provisional velocity at each depth level;

correlating, at each depth level, a second portion of the signal from said one of said locations with second portions of signals from the other locations, the second portions of the signals from the other locations being determined from an assumed velocity, said correlating of second portions being performed for a number of different assumed velocities to obtain a resultant second provisional velocity at each depth level;

generating an output velocity, at each depth level, as a function of said first and second provisional velocities; and generating a depth varying recording of said output velocity.

94. The method as defined by claim 93 wherein said first and second portions of the signals are compressional wave components and the output velocity is an output compressional wave velocity.

95. The method as defined by claim 93 wherein said first and second portions of the signals are shear wave components and the output velocity is an output shear wave velocity.

96. The method as defined by claim 93 wherein said first and second portions each have a duration of substantially an integral number of half-cycles, not exceeding two full cycles, of the signal from said one location.

97. The method as defined by claim 94 wherein said first and second portions each have a duration of substantially an integral number of half-cycles, not exceeding two full cycles, of the signal from said one location.

98. The method as defined by claim 95 wherein said first and second portions each have a duration of substantially an integral number of half-cycles, not exceeding two full cycles, of the signal from said one location.

* * * * *

UNITED STATES PATENT AND TRADEMARK OFFICE
CERTIFICATE OF CORRECTION

PATENT NO. : 4,367,541

DATED : January 4, 1983

INVENTOR(S) : Bronislaw Seeman

It is certified that error appears in the above-identified patent and that said Letters Patent is hereby corrected as shown below:

In the Abstract, line 12, "correcting" should read --correlating--.

In the Specification, column 7, line 19, "waveforms, each" should read --waveforms, wherein each--; line 59, "116" should read --106--. Column 8, line 47, "initisl" should read --initial--; line 49, "of" (first occurrence) should read --or--; line 61, "(with $d_1=d_2=3=$for" should read --(with $d_1=d_2=d_3=d$ for--. Column 10, line 10, "or" should read --of--; line 65-66, "expected" should read --exceeded--. Column 12, line 66, "discraded" should read --discarded--.

In the Claims, column 14, line 1, (Claim 1) "for" (second occurrence) should read --of--. Column 16, line 16, (Claim 19) "definded" should read --defined--. Column 17, line 67, (Claim 35) "protions" should read --portions--. Column 20, line 30, (Claim 58) "signals" should read --signal--. Column 23, line 62, (Claim 84), "of" should read --on--. Column 24, line 22, (Claim 84), "or" should read --of--.

Signed and Sealed this

Sixth Day of December 1983

[SEAL]

Attest:

GERALD J. MOSSINGHOFF

Attesting Officer    Commissioner of Patents and Trademarks